UNITED STATES PATENT OFFICE.

DANIEL CAMPBELL, OF BALTIMORE, MARYLAND.

PAINT COMPOSITION.

1,344,861.      Specification of Letters Patent.      Patented June 29, 1920.

No Drawing.      Application filed April 3, 1919. Serial No. 287,258.

*To all whom it may concern:*

Be it known that I, DANIEL CAMPBELL, a citizen of the United States, residing at Baltimore, State of Maryland, have invented certain new and useful Improvements in Paint Composition, of which the following is a specification.

My invention relates to a paint composition, and more particularly to that class of paint used in the painting of metals such as tin roofs, but is equally applicable to the painting of wood surfaces, and particularly such surfaces of both wood and metal which are exposed to water such as vessels and boats of various descriptions.

My invention has for its object the production of a paint which will be cheap to manufacture, will dry fast and will not crack or peel, and will retain its color.

The composition consists, first in a body composition, and secondly a liquid compound or vehicle for the body composition and when combined in the manner hereinafter described form a liquid mixed paint.

The liquid composition has for its ingredients crude and linseed oils, and the body composition asphalt, rosin and metallic brown, metallic brown being a natural clay containing approximately, iron oxid, seventy five per cent.; silica, twelve per cent., and alumina, thirteen per cent., the clay being first baked or burnt and then pulverized to a fineness, said ingredients to be mixed in the following manner.

To prepare this liquid composition in quantities to make a single gallon of the liquid paint, I take two pounds of asphalt, one half pound of rosin, five pints of crude oil, half pint of linseed oil and five pounds of metallic brown and mix in the following manner. The asphalt is placed in a suitable receptacle and heated to a boiling point, I next add the rosin, the effect of the rosin on the asphalt is to cause it to bubble and rise in the kettle or receptacle and thins the mixture. I next withdraw the heat and add the metallic brown and mix the mixture thoroughly and knead it into a doughy mixture after which I next add the crude oil. This mixture is again subjected to heat and heated to a boiling point, and when a boiling point of the mixture is attained the linseed oil is added and thoroughly mixed with the other ingredients and this mixture is then continued to be boiled at a boiling point from fifteen to thirty minutes, all the while during the boiling operation care being taken to thoroughly stir and mix the composition until all streaks are removed therefrom. The composition is then removed from the heat or fire and the stirring process continued at intervals until the composition becomes more or less cool after which the composition is ready for use and market.

Having described my invention, what I claim as new and desire to secure by Letters Patent, is:

The within described paint composition consisting of asphalt, rosin, crude oil, linseed oil and metallic brown, mixed in the manner and approximately the proportions specified, substantially as described.

In testimony whereof I affix my signature in the presence of two witnesses.

DANIEL CAMPBELL.

Witnesses:
     E. WALTON BREWINGTON,
     HOWARD D. ADAMS.